United States Patent
Woundy et al.

(10) Patent No.: US 7,774,436 B2
(45) Date of Patent: Aug. 10, 2010

(54) METHOD AND SYSTEM FOR INTERNET PROTOCOL PROVISIONING OF CUSTOMER PREMISES EQUIPMENT

(75) Inventors: Richard Woundy, North Reading, MA (US); John G. Bevilacqua, Boulder, CO (US)

(73) Assignee: Comcase Cable Holdings, LLC, Philadelphia, PA (US)

( * ) Notice: Subject to any disclaimer, the term of this patent is extended or adjusted under 35 U.S.C. 154(b) by 0 days.

(21) Appl. No.: 10/570,832

(22) PCT Filed: Sep. 7, 2004

(86) PCT No.: PCT/US2004/028907
§ 371 (c)(1),
(2), (4) Date: Feb. 5, 2007

(87) PCT Pub. No.: WO2005/024588
PCT Pub. Date: Mar. 17, 2005

(65) Prior Publication Data
US 2007/0198717 A1  Aug. 23, 2007

Related U.S. Application Data
(60) Provisional application No. 60/501,231, filed on Sep. 5, 2003.

(51) Int. Cl.
*G06F 15/173* (2006.01)
*G06F 15/177* (2006.01)
*H04N 7/173* (2006.01)

(52) U.S. Cl. ............... 709/220; 709/223; 725/110
(58) Field of Classification Search ............ 709/220, 709/222–223; 348/552; 725/110, 131; 726/11
See application file for complete search history.

(56) References Cited

U.S. PATENT DOCUMENTS

| | | | |
|---|---|---|---|
| 7,194,756 B2 * | 3/2007 | Addington et al. | 725/116 |
| 7,287,257 B2 * | 10/2007 | Meza | 719/321 |
| 2002/0071440 A1 * | 6/2002 | Cerami et al. | 370/404 |
| 2002/0143565 A1 * | 10/2002 | Headings et al. | 705/1 |
| 2003/0048380 A1 * | 3/2003 | Tamura | 348/552 |
| 2004/0261126 A1 * | 12/2004 | Addington et al. | 725/135 |
| 2005/0228877 A1 * | 10/2005 | Monitzer et al. | 709/223 |

* cited by examiner

*Primary Examiner*—Philip J Chea
(74) *Attorney, Agent, or Firm*—Banner & Witcoff, Ltd.

(57) ABSTRACT

Method and system for Internet Protocol (IP) provisioning over a cable network. The method and system including a plurality of embedded settop boxes (eSTBs) of at least two different vendors requesting IP provisioning according to a first protocol. The method and system further including a network provisioning unit (NPU) in communication with the eSTBs over the network for responding to the eSTB IP provisioning requests with IP provisioning data, wherein the eSTB IP provisioning data is outputted according to the first protocol such that provisioning of the eSTBs is standard for each vendor in so far as each eSTB utilizes the first protocol for provisioning.

22 Claims, 1 Drawing Sheet

METHOD AND SYSTEM FOR INTERNET PROTOCOL PROVISIONING OF CUSTOMER PREMISES EQUIPMENT

CROSS-REFERENCE TO RELATED APPLICATIONS

This application claims priority to PCT application Serial No.
PCT/US2004/028907 filed Sep. 7, 2004, which claims the benefit of U.S. provisional application Ser. No. 60/501,231 filed Sep. 5, 2003.

BACKGROUND OF THE INVENTION

1. Field of the Invention

The present invention relates to methods for provisioning Customer Premises Equipment (CPE). In particular, the present invention relates to Internet Protocol (IP) provisioning for use in a cable network having a network provisioning unit (NPU) in communication with CPE having embedded settop boxes (eSTBs).

2. Background Art

Customer Premises Equipment (CPE) is a broad term intended to refer to devices located at a subscriber station of a cable subscriber that are used to receive signals from a cable network. In particular, the CPE may include an embedded settop box (eSTB) to receive television signals and to output the received signals to a television or other device for viewing. In addition, the CPE may include an embedded cable modem (eCM) to receive signals to control, provision, manage, and secure the CPE, such as through Data Over Cable Services Interface Specification (DOCSIS) Out-Of-Band (OOB) messaging.

A need exists for Internet Protocol (IP) provisioning of the eSTB of the CPE over a cable network.

SUMMARY OF THE INVENTION

The present invention contemplates a number of features and configurations to provide IP provisioning, including a system comprising a plurality of embedded settop boxes (eSTBs) and a network provisioning unit (NPU) in communication with the cable network.

The system preferably includes a plurality of eSTBs provided by at least two different vendors, wherein each eSTB is preferably configured to output IP provisioning requests to the network according to a first protocol. The NPU is preferably configured to receive the eSTB IP provisioning requests and output eSTB IP provisioning data in response thereto, wherein the eSTB IP provisioning data is outputted according to the first protocol such that provisioning of the eSTBs is standard for each vendor in so far as each eSTB utilizes the first protocol for provisioning. Preferably, the first protocol is defined according to a Dynamic Host Configuration Protocol (DHCP).

In accordance with one aspect of the present invention, the NPU preferably selects the provisioning data according to the vendor of the requesting eSTB. Preferably, the NPU determines the vendor of the requesting eSTB based on an eSTB vendor identifier included in the eSTB IP provisioning request. Preferably, the NPU includes a database comprising IP provisioning data associated by vendor identifiers with a plurality of eSTB vendors, wherein the NPU determines the vendor of the requesting eSTB by searching the database for a vendor identifier that matches with the eSTB vendor identifier. In accordance with one aspect of the present invention, the eSTB vendor identifier may be a serial number, a hardware version, a software version, an Organization Unique Identifier (OUI), a model number, or a vendor name.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
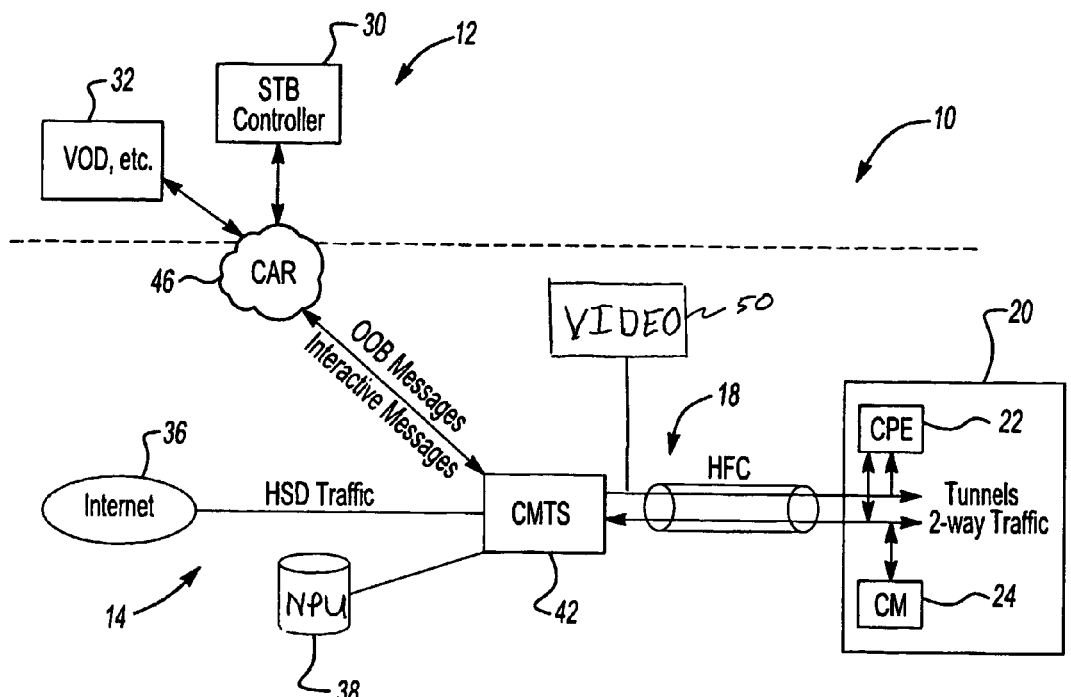
FIG. 1 illustrates a cable system in accordance with one aspect of the present invention.

FIG. 1 illustrates a cable system 10 in accordance with one aspect of the present invention. The system 10 includes a management network 12 and a High Speed Data (HSD) network 14 that respectively provide management and HSD services over a hybrid fiber coax (HFC) 18, or other communication medium, to a subscriber station 20, which includes Customer Premises Equipment (CPE) 22 and a cable modem (CM) 24.

The management network 12 generally comprises two portions, a control portion 30 and an application portion 32. The control portion 30 includes a settop box (STB) controller to control, provision, manage, and secure the CPE 22 through out-of-band (OOB) messaging. The application portion 32 provides applications to the CPE 22, such as video on demand (VOD), interactive television (iTV), and other services.

The HSD network 14 provides data services for the system 10, including services for the CM 24 to access the Internet 36. It includes a network provisioning unit (NPU) 38 having capabilities for Dynamic Host Configuration Protocol (DHCP), Trivial File Transfer Protocol (TFTP), and the like, in addition to a Domain Name System (DNS) server.

The system 10 includes a cable modem termination system (CMTS) 42 to send and receive signals to and from the CPE 22 and the CM 24 over the HFC 18. In general, the CMTS 42 transfers IP packets from the HSD network 14 and the management network 12 to the CPE 22 and CM 24 for processing. Preferably, the signals are outputted from the CMTS 42 on downstream output channels, which preferably include one-way output data tunnels, such as for OOB messaging. In addition, the CMTS 42 is configured to receive signals from the CPE 22 and the CM 24 to support two-way communication therewith, such as for transfer of IP packets from the CPE 22 and/or the CM 24 to the Internet 36 and/or the VOD or STB controller portions 32 and 30.

The system 10 includes a conditional access router (CAR) 46 to connect the management network 12 to the CMTS 42. The CAR 46 transports signals therebetween using IP protocols and provides firewall separation for the VOD or STB controller portions 32 and 30 from the HSD network 14, enhancing security from any devices attempting to associate with devices and signaling on the management network 12. In operation, signaling traffic transported between the management network 12 and the CMTS 42 may be wrapped into addressable packets, such as Ethernet, IP, or other packets.

The system 10 includes a video unit 50 for delivering video signals to the subscriber station 20 over the HFC 18. The video unit 50 can deliver any number of video signals, including network television, cable television, pay-per-view, video on demand, and the like.

Figure 2:
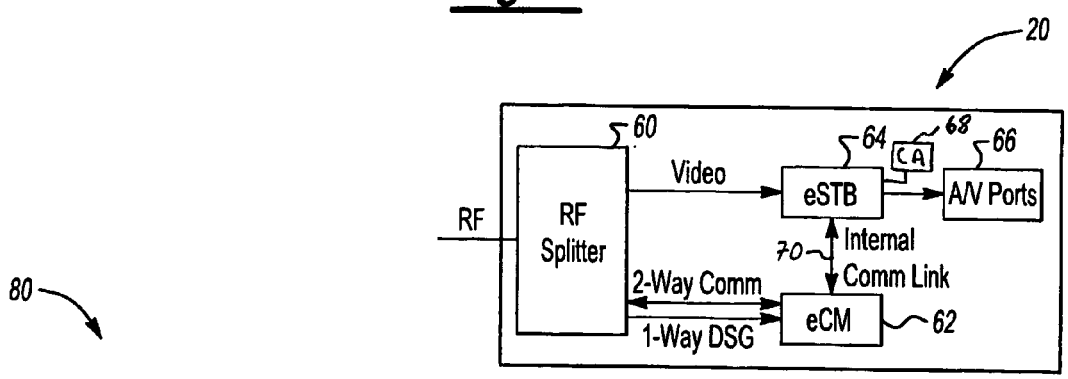
FIG. 2 illustrates Customer Premise Equipment (CPE) in accordance with one aspect of the present invention.

FIG. 2 illustrates the CPE 22 in accordance with one aspect of the present invention. The CPE 22 is preferably configured to communicate with the CMTS 42 through digital cable signals, such as through signaling defined by the Data Over Cable Service Interface Specification (DOCSIS) and/or through other protocols authorized through DHCP registration.

The CPE 22 includes a radio frequency (RF) splitter 60, an embedded cable modem (eCM) 62, an embedded set-top box (eSTB) 64, an audio visual (A/V) port 66, and an optional conditional access (CA) unit 68. The RF splitter 60 splits the RF signal into two portions—one for OOB control functions and two-way application traffic and one for video delivery. The OOB and two-way application traffic is relayed to the eCM 62 and the video is relayed to the eSTB 64.

The ESTB 64 outputs video and other media signals to a media output device (not shown) or other device connected to the A/V port 66, such as to a television (TV), digital video recorder (DVR), personal video recorder (PVR), or the like.

The eCM 62 processes control and other non-media signals, such as DOCSIS and other IP packets, and bridges or relays the signals to the eSTB 64 through an internal communications link 70. In particular, the communications link 70 is used to transfer data tunnels tuned to by the eCM 62 to the eSTB 64 so that OOB messaging signals can be delivered to the eSTB 64 for processing.

The CA unit 68 provides conditional access control for the subscriber station 20. It can be a CableCard, SmartCard, or other item for controlling security and access to the data, video, and control signals transmitted over the HFC 18. It is illustrated as a standalone item, however, it can be included with or embedded on the eSTB 64 or the eCM 62 to perform similar functions.

The eCM 62, eSTB 64, and CA unit 68 are logically separate entities, however, they may physically share hardware and software. Other items, such as control logic and applications may be included on the CPE 22 for controlling operation of the eSTB 64 and/or the eCM 62.

Figure 3:
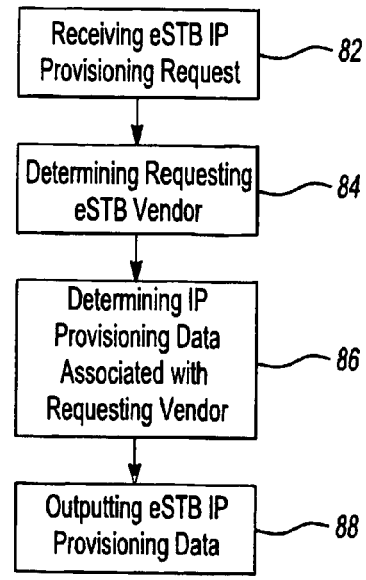
FIG. 3 illustrates a flowchart of method of eSTB IP provisioning in accordance with one aspect of the present invention.

FIG. 3 illustrates a flowchart 80 of method of eSTB IP provisioning in accordance with one aspect of the present invention. The method is preferably executed using DHCP protocols, however, the present invention is not so limited.

Block 82 relates to receiving an eSTB IP provisioning request at the NPU 38 from at least two eSTBs 64 associated with two different vendors. The receipt of multiple eSTB IP provisioning requests from different vendors requires the system 10 to support IP provisioning according to the configuration and operation of the different vendors.

Block 84 relates to determining the vendors associated with the requesting eSTBs 64. For example, if two eSTB IP provisioning requests are received from eSTBs 64 from a first vendor and a second vendor, the second vendor being different from the first vendor, the first and second vendors must be identified. Preferably, the eSTB IP provisioning requests each include an eSTB vendor identifier for identifying the vendor, such as a serial number, a hardware version, a software version, an Organization Unique Identifier (OUI), a model number, or a vendor name.

Block 86 relates to determining eSTB IP provisioning data associated with the vendor identified in block 84. Preferably, the NPU 38 includes a database (not shown) having IP provisioning data for each vendor supported by the system 10, including the first and second vendor, which is associated with a vendor identifier. The NPU 38 is configured to compare the eSTB vendor identifier against the vendor identifiers in the database to determine the vendor associated with the requesting eSTB 64.

Block 88 relates to outputting the eSTB IP provisioning data to the requesting eSTB 64. In particular, the NPU 38 receives a request from a specific eSTB 64 in 82, and replies to that specific eSTB 64 in block 88 to preferably provide eSTB IP provisioning data for enabling IP address assignment to the eSTB 64 to help the eSTB 64 communicate to the rest of the system 10 and other networks connected thereto, such as through the Internet 36, and to provide eSTB IP provisioning data for supplying parameter values to the eSTBs 64 for eSTB and application initialization. For example, the eSTB 64 may learn the location of a DNS server through IP provisioning, so that it can look up the hostname of the VoD server 32 and communicate with it. In another example, the eSTB 64 may receive a parameter that instructs the eSTB 64 to disable a vendor-specific A/V port, because usage of that particular A/V port may require a special customer subscription. The corresponding parameter in IP provisioning may be vendor-specific, so it is important that the NPU 38 not send this vendor-specific parameter to all eSTBs 64.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   receiving STB IP provisioning requests from STBs, provided by at least two different vendors, through a signaling pathway that uses a firewall to separate a management network from a data network housing a network provisioning unit (NPU), the management network and the data network functioning on a content distribution side of a network;
   identifying one of the at least two different vendors associated with the STBs;
   identifying STB IP provisioning data associated with each identified vendor; and
   transmitting the identified STB IP provisioning data from the NPU to the STBs requesting the STB IP provisioning, through the signaling pathway, wherein the identified STB IP provisioning data is outputted according to a first protocol such that the provisioning of the STBs is standardized for each of the at least two different vendors,
   wherein the firewall provides separation for a video-on-demand (VOD) controller and STB controller portion in the management network from the data network.

2. The method of claim 1 further comprising determining the vendor of the requesting STB using the NPU based on an STB vendor identifier included in the STB IP provisioning request.

3. The method of claim 2 wherein the NPU includes a database comprising IP provisioning data associated by vendor identifiers with a plurality of STB vendors, and wherein determining the vendor of the requesting STB includes searching the database for a vendor identifier that matches with the STB vendor identifier.

4. The method of claim 2 wherein the STB vendor identifier includes at least one of a serial number, a hardware version, a software version, an Organization Unique Identifier (OUI), a model number, or a vendor name.

5. The method of claim 1 wherein each STB is associated with Customer Premise Equipment (CPE) and wherein each CPE includes an embedded cable modem (eCM), and the method further comprises bridging IP signals through the eCM to the STB.

6. The method of claim 1 wherein the first protocol is defined according to a Dynamic Host Configuration Protocol (DHCP).

7. The method of claim 1, wherein said network is an information distribution network.

8. A system for Internet Protocol (IP) provisioning over a network, the system comprising:
   a plurality of set top boxes (STBs) in communication with the network, at least two of the STBs provided by at least two different vendors, each STB configured to transmit, according to a first protocol, IP provisioning requests through a signaling pathway that uses a firewall to separate a management network from a data network within the network, the management network and the data network functioning on a content distribution side of the network; and
   a network provisioning unit (NPU) within the data network, the NPU configured to receive the STB IP provisioning requests, identify one of the at least two different vendors associated with the STBs, identify STB IP provisioning data associated with each identified vendor, and transmit the identified STB IP provisioning data through the signaling pathway, wherein the identified STB IP provisioning data is transmitted according to the first protocol such that the provisioning of the STBs is standard for the at least two different vendors in so far as each STB utilizes the first protocol for provisioning,
   wherein the firewall provides separation for a video-on-demand (VOD) controller and STB controller portion in the management network from the data network.

9. The system of claim 8 wherein the NPU selects the provisioning data according to the vendor of the requesting STB.

10. The system of claim 9 wherein the NPU determines the vendor of the requesting STB vendor identifier included in the STB IP provisioning request.

11. The system of claim 10 wherein the NPU includes a database comprising IP provisioning data associated by vendor identifiers with a plurality of STB vendors, and wherein the NPU determines the vendor of the requesting STB by searching the database for a vendor identifier that matches with the STB vendor identifier.

12. The system of claim 8 wherein the first protocol is defined according to a Dynamic Host Configuration Protocol (DHCP).

13. The system of claim 8, wherein said network is an information distribution network.

14. A method comprising:
   receiving provisioning requests from STBs through a signaling pathway that uses a firewall to separate a management network from a data network housing a network provisioning unit (NPU), the management network and the data network functioning on a content distribution side of an information distribution network;
   identifying at least one of the STBs requesting the provisioning to be associated with a first vendor and at least another one of the STBs requesting the provisioning to be associated with a second vendor;
   identifying provisioning instructions associated with each identified vendor; and
   providing the provisioning instructions to the requesting STBs according to the different instructional requirements of the first and second vendors identified to be associated with the requesting STBs through the signaling pathway, the provisioning instructions being sufficient to program the requesting STBs to execute a set of operations associated with supporting media services provided by a media service provider,
   wherein the firewall provides separation for a video-on-demand (VOD) controller and STB controller portion in the management network from the data network.

15. The method of claim 14 wherein the provisioning requests are received and the provisioning instructions are sent according to a same protocol.

16. The method of claim 15 including processing the first IP provisioning requests from a first STB from the first vendor and processing the second IP provisioning requests from a second STB from the second vendor.

17. The method of claim 14 wherein the media provider provides the media services with assistance from a first and second headend unit, and wherein the method further comprises adjusting the provisioning instructions depending on whether the requesting STBs are associated with the first or second headend unit.

18. The method of claim 14 wherein the media provider provides the media services with assistance from a first and second headend unit that are respectively associated with third and fourth vendors and the STBs have different instructional requirements depending on whether the STBs are receiving signals from the headend of the third or fourth vendor, wherein the method further comprises providing the provisioning instructions to the requesting STBs according to the different instructional requirements of the first and second vendors as well as the third and fourth vendors.

19. The method of claim 18 wherein the first and second vendors are different from the third and fourth vendors.

20. The method of claim 18 wherein the third vendor is different from the fourth vendor.

21. The method of claim 18 wherein at least one of the first or second vendors is the same as one of the third or fourth vendors.

22. The method of claim 14 wherein the STBs are configured to process television signals for output to a display and the method further comprises transmitting the provisioning instructions to the STBs over the information distribution network.

* * * * *